Nov. 22, 1927.
R. C. LIVESAY
HARVESTER PACKER SUPPORT
Filed June 5, 1922
1,650,369
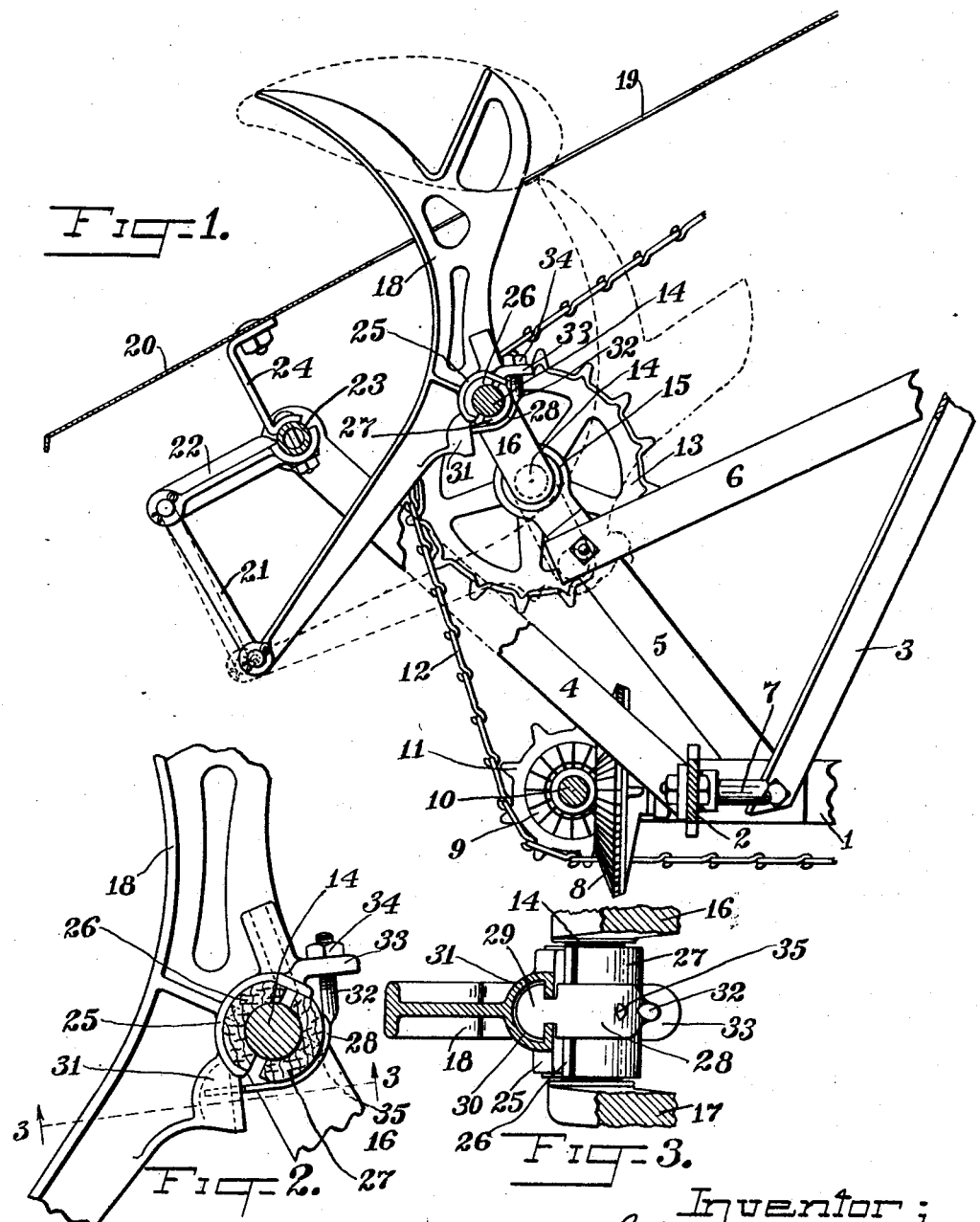

Patented Nov. 22, 1927.

1,650,369

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

HARVESTER PACKER SUPPORT.

Application filed June 5, 1922. Serial No. 566,062.

My invention relates to grain harvesters and binders, and more particularly to the packer mechanism thereof, and my object is to provide a support for the packers embodying qualities which will be fully detailed in the following specification.

Referring to the drawings in which similar numerals indicate identical parts:—

Figure 1 is a fragmentary view of part of a harvester and binder illustrating a packer and connected parts embodying my invention. Figure 2 is an enlarged detail side elevation of the packer support, and Figure 3 is a section on the line 3—3 of Figure 2.

Parts 1, 2 and 3 are of the harvester framing, and parts 4, 5 and 6 are supports for the packer mechanism and are secured to the harvester framing in the usual manner. The actuating power for the packers, only one of which is shown, is transmitted from the bull-wheel of the machine to a shaft 7 journaled on the frame bar 2 and having mounted thereon a beveled gear 8; a beveled pinion 9 is mounted on a shaft 10, on the frame of the harvester, and meshes with the beveled gear 8. A sprocket 11 is also secured on the shaft 10 and over it leads a chain 12 which passes over and rotates a sprocket 13 on the packer crank shaft 14 and then passes on to the elevators of the harvester, not shown in the drawing. The sprocket crank shaft 14 is rotatably supported in a bearing 15 on the part 5, it being understood that a similar part and bearing supports the crank shaft 14 at its opposite end as in all harvesters and binders.

Between crank arms 16 and 17 of the crank shaft 14 is mounted a packer 18 which operates through a slot 19 in a binder deck 20. The lower end of the packer 18 is pivotally connected to a link 21 pivotally attached to an arm 22 rigidly mounted on a beam 23 secured on the part 4. Also mounted on the beam 23 is a support 24 for the stubbleward part of the binder deck 20. All the parts heretofore enumerated are common to the modern harvester and binder and well known in the art.

Packers are elements in a binding mechanism and operate to convey to the tying mechanism grain delivered on the binder deck by the elevators. This grain accumulates against a trip arm, not shown, and as the quantity increases the resistance to the action of the packers also increases until it is sufficiently strong to release the trip arm, after which the bundle is tied and discharged from the binder. The action of the packers is positive and of a fixed limit and there is little if any resistance to the packers at the beginning of the formation of a bundle, but as the bulk of the latter increases the contact of the packers against the accumulating grain results in a back thrust or shock which must be sustained by the packer support with increasing wear and consequent looseness of parts. I overcome this serious defect by the following described construction.

Substantially central of the rear of the packer 18, and preferably integral therewith, is a half bearing 25 which extends transversely of the packer 18 and beyond the side thereof; within the half bearing 25 is part 26 of a bushing having a groove for reception of the crank shaft 14. On the opposite side of the crank shaft 14 is the second part 27 of the bushing, also provided with a groove for the packer shaft 14. To hold the packer and the parts firmly together I employ a pliant band 28 having a T head 29 which is secured in a recess 30 in an enlargement 31 on the packer 18 the band 28 and the half bearing 25 forming the complete bearing; the band 28 extends outside of and in close contact with the part 27, and its upper end 32 is rounded to extend through a hole in a projection 33 preferably integral with the packer 18. On the threaded end of the band 28 is a nut 34 by operation of which the bushing parts 26 and 27 are firmly held in place on the crank shaft 14; the parts 26 and 27 are prevented from turning on the crank shaft 14 by flat faces on opposite sides thereof abutting against flat surfaces on the interior of the half bearing 25, both of the flat surfaces of the bushing part 26 contacting with the flat surfaces in the bearing part 25, the part 27 of the bushing having only one of its flat surfaces in such contact, and as a further means for holding the part 27 in position the latter is attached to the band 28 by a pin 35. Sufficient space is provided between the parts 26 and 27 of the bushing for proper adjustment to compensate for wear, and this adjustment is accomplished by operating the nut 34, the flattened portion of the second part of the bushing contacting with a flattened portion of the first part of the bearing to operate as a guide, as an adjustment is made, to assure uniformity of wear.

The parts 26 and 27 are made of wood, preferably maple, having a fibrous density capable of withstanding wearing action of the crank shaft and radial shock from the packer action, and at the same time having sufficient porosity to hold, for an indefinite period, oil with which they are impregnated for purposes of lubrication.

What I claim is—

In a harvester and binder, the combination with a packer and its crank shaft, of a two-part bearing on the packer in which the crank shaft is rotatably journaled one of the parts being pliant and adjustable, the adjustable part having an end held in a recess in the packer and its opposite end threaded and extending through a projection on the packer, a two-part bushing in said bearing, one of said parts spaced from the other part and attached to the adjustable part of the bearing, and a nut on the threaded end of the adjustable part to hold the latter in place and operative to adjust said part and the bushing part attached thereto to compensate for wear of the latter.

ROBERT C. LIVESAY.